Oct. 5, 1965  HISAMICHI SUZUKI  3,209,873
CLUTCH AND BRAKE SHUTTER OPERATING MECHANISM
Filed Oct. 4, 1963  3 Sheets-Sheet 1

Hisamichi Suzuki,
INVENTOR.

BY Wenderoth, Lind
and Ponack,
attorneys

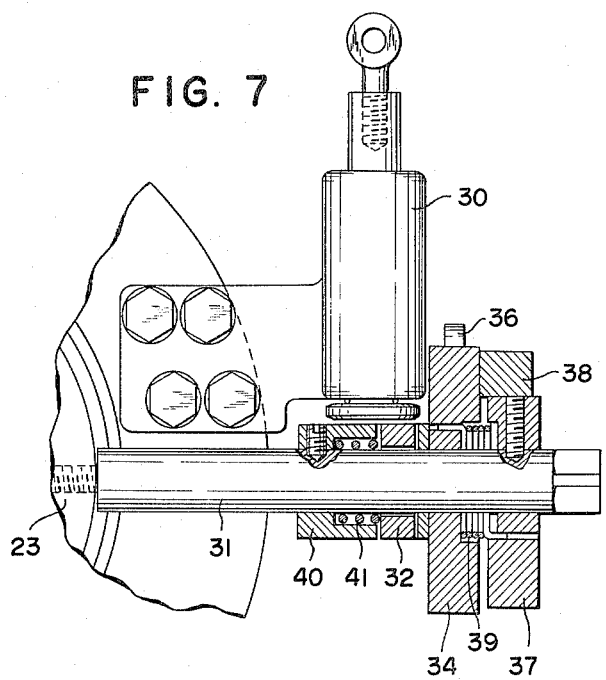
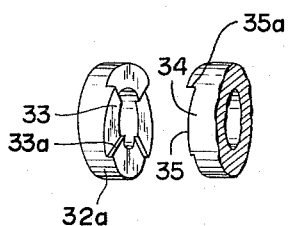
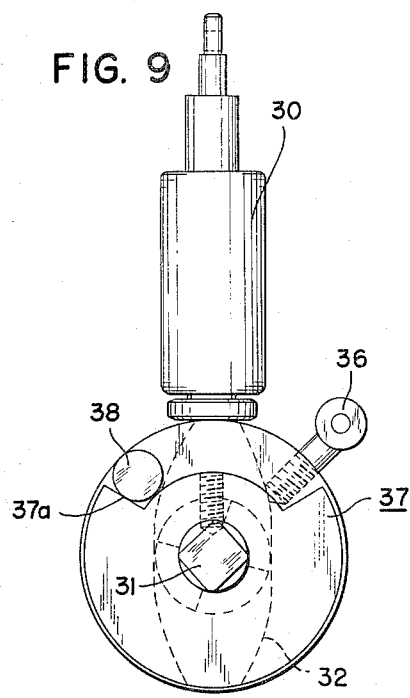
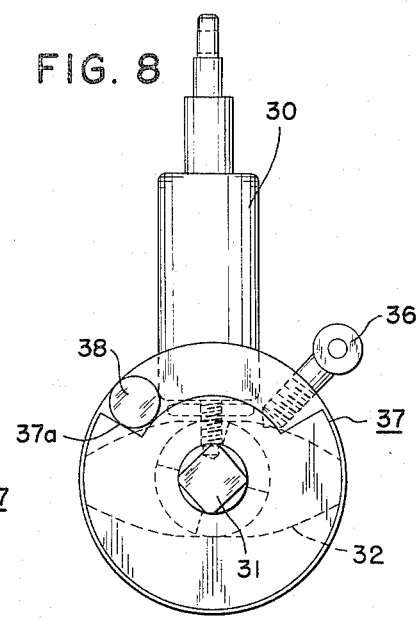

United States Patent Office 3,209,873
Patented Oct. 5, 1965

3,209,873
CLUTCH AND BRAKE SHUTTER
OPERATING MECHANISM
Hisamichi Suzuki, 300 Chojamaru Kami Osaki,
Shinagawa-ku, Tokyo, Japan
Filed Oct. 4, 1963, Ser. No. 314,017
2 Claims. (Cl. 192—18)

The present invention relates to an improvement in a shutter opening and closing mechanism.

The present invention is characterized in that on a driving shaft of a prime motor for opening and closing a shutter, there is slidably a main clutch coupling disk having an engaging part on its coupling end surface, and also an auxiliary clutch coupling disk having an engaging part adapted to be engaged with and disengaged from the engaging part of said main clutch coupling disk is loosely fitted on the same shaft. On a driven shaft arranged coaxially with said driving shaft, another clutch coupling disk is slidably mounted, and on the respective opposed surfaces of this coupling disk and said auxiliary clutch coupling disk, there are respectively provided a number of slots having a semi-circular cross-section or semi-spherical recesses forming a plurality of pairs, within each of which pairs is accommodated a spherical body having a slightly smaller diameter than that of the pair of slots or recesses. A cone brake is formed between said clutch coupling disk mounted on said driven shaft and an inner wall of a casing, in such a manner that driving control may be freely achieved in response to only torque control without requiring relative movement between the driving and driven shafts. A cable is fixedly secured to an actuating clutch disk for releasing the brake which clutch disk is loosely fitted to the driving shaft so as to be opposed to a fixed clutch disk which is fixedly secured to the casing and loosely fitted around the driving shaft, whereby upon pulling said cable, the brake may be manually released and also the engagement between said main and auxiliary clutch coupling disks may be simultaneously released.

A principal object of the present invention is to provide an apparatus in which by means of only torque control, a driving shaft of a prime motor for opening and closing a shutter is caused to be quickly stopped with a brake and each of the component parts is caused to stop at a predetermined position.

Another object of the present invention is to provide an apparatus in which upon manual operation, starting of the shutter opening and closing mechanism is properly achieved, and in the case of permitting the shutter to descend by its own weight, the descending motion is carried out quickly.

Other objects and advantages of the present invention will become apparent from the following disclosure of its preferred embodiments.

Figure 1:
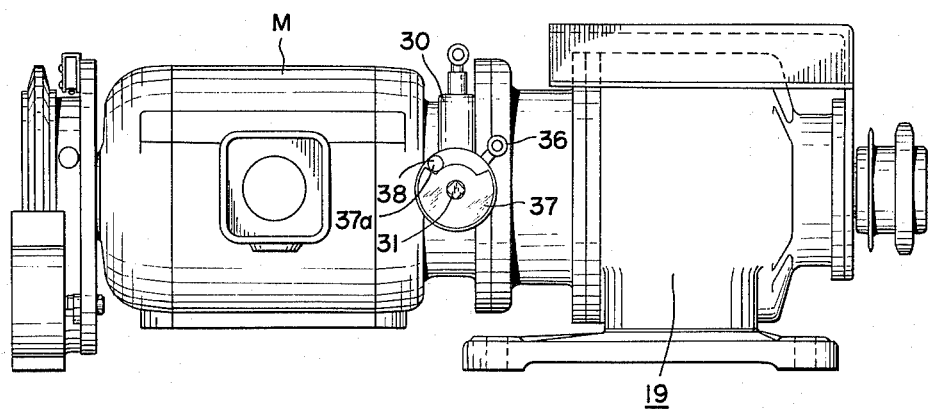
Figure 2:
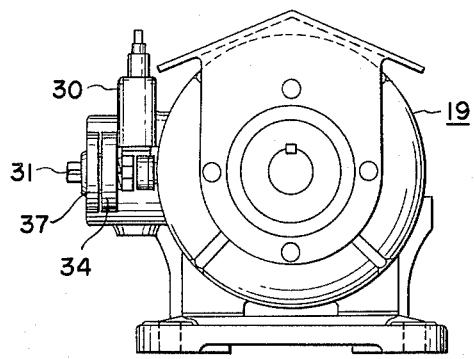
Figure 3:
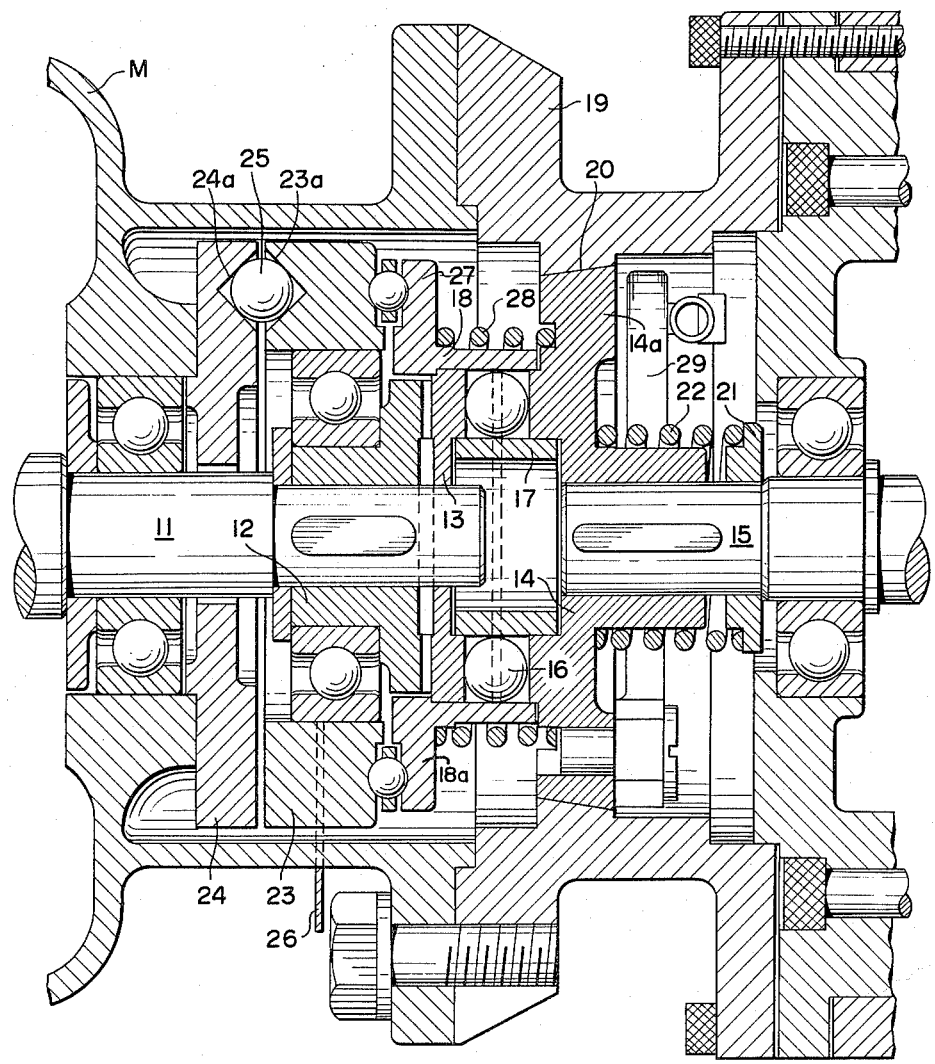
Figure 4:
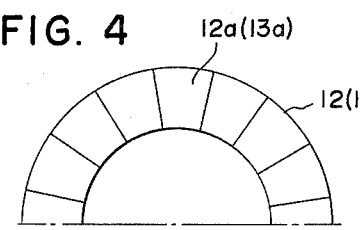
Figure 5:
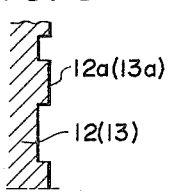
Figure 6:
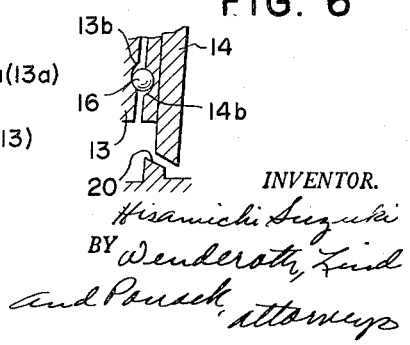

FIG. 1 of the drawings is a front view showing a preferred embodiment of the mechanism according to the present invention, FIG. 2 is an end view of the same, FIG. 3 is an enlarged longitudinal cross-section view of the coupling portion of the mechanism provided with a brake, FIG. 4 is a partial front view showing a coupling surface of a clutch disk, FIG. 5 is a side view of the clutch disk, FIG. 6 is a view showing an auxiliary coupling disk and its mode of operation, FIG. 7 is a side elevation view, partly in cross-section, of an automatic descending apparatus of a shutter in said mechanism under an unoperated condition, FIG. 8 is a front view of the same, FIG. 9 is a front view of the same in a different operational condition, and, FIG. 10 is a perspective view showing the relative rotational positions between a rotor and an actuator.

Now the present invention will be explained with reference to the embodiments illustrated in the drawings. Referring to FIGS. 3–6, on a driving shaft 11 of a prime motor M for opening and closing a shutter, is slidably mounted by means of a key spline and the like, a main clutch coupling disk 12 having engaging teeth 12a on its end surface; on an end of the driving shaft is loosely fitted an auxiliary clutch coupling disk 13 having engaging teeth 13a on one end face thereof adapted to be engaged with and disengaged from said engaging teeth 12a; on the other end surface of this coupling disk 13, are provided a number of slots each having a semi-circular cross-section or semi-spherical recesses 13b each positioned in a radial manner at an equal radial distance from the axis with an equal angular distance therebetween; another clutch coupling disk 14 having a number of similar slots or recesses 14b at positions opposed to those slots or recesses 13b, is slidably mounted on an end of a driven shaft 15 positioned along the same axis as the driving shaft 11, so as to oppose the coupling disk 13 at a minimum distance therefrom; and between the opposite slots or recesses 13b, 14b, of the body coupling disks 13, 14, are accommodated steel balls 16 having a slightly smaller diameter than these slots or recesses, and collars 17, 18 are positioned on the inner and outer peripheries of said balls so as to form a coupling between the disks while preventing disengagement of the steel balls 15.

Along an outer periphery of said coupling disk 14 is provided a brake wheel 14a, on the peripheral surface of which is mounted a brake lining (not shown). A flange having on its inner periphery a frictional surface 20 of a conical shape to make contact with said brake lining projects inwardly from a housing 19, and between the coupling disk 14 and a collar 21 mounted on the driven shaft 15 is inserted a tensioned spring 22 which serves to press the brake lining of the coupling disk 14 against the frictional surface 20.

In addition, around an outer periphery of the main clutch coupling disk 12 is mounted an actuating clutch disk 23 for releasing the brake so that it freely rotates with respect to the coupling disk 12, said actuating clutch disk being opposed to a fixed clutch disk 24 which is fixedly secured to the housing 19 and loosely fitted on the driving shaft 11. On the opposed surfaces of both disks 23, 24 are respectively provided a number of recesses 23a, 24a corresponding to each other at an equal radial distance and at an equal angular distance from each other, between which recesses are inserted steel balls 25 having a slightly smaller diameter than these recesses, and one end of a cable 26 is connected to the outer periphery of the clutch disk 23.

Now the other end surface of said clutch disk 23 rotatably contacts an end surface of a flange 18a provided on one end of the collar 18 through a ball bearing adjacent 27. Between the flange 18a and the coupling disk 14 is inserted a spring 28 which always presses the flange 18a against the clutch disk 23 by means of its resilient force, and a notched step portion on an inner periphery of the collar 18 is fixedly secured to an end surface of said auxiliary clutch coupling disk 13.

In FIG. 3, the reference 29 indicates a governor.

Upon rotating the driving shaft 11 of the prime motor M, the main clutch coupling disk 12 and the auxiliary clutch coupling disk 13 engaged therewith are forced to rotate. However, as the clutch coupling disk 14 cannot rotate because of the engagement between its brake lining and the frictional surface 20 of the housing 19, there occurs some difference in angular position between the auxiliary clutch coupling disk 13 and the clutch coupling disk 14, which creates a force pushing the steel ball out of the slot or recess 13b, 14b and thus presses the clutch coupling disk 14 rightwardly in FIG. 3 against the resilient force of the spring 22, so that the engagement between the brake wheel 14a and the frictional surface 20 is released so as to terminate the braking force, and consequently the disks with recesses 13b, 14b rotate together with the steel ball 16 held therebetween in a somewhat angularly displaced condition, with the result that the driving shaft 11 and the driven shaft 15 are coupled to each other and the driven shaft 15 rotates in accordance with the rotation of the driving shaft 11.

On the other hand, upon interrupting of the rotation of the driving shaft 11, the torque transmitted by the clutch coupling disks 12, 13 disappears, so that the steel ball 16 is restored to its original position deep within the slot or recess 13b, 14b due to the resilient force of the spring 22, with the result that the clutch disk 14 moves leftwardly in FIG. 3 so as to press the brake lining on the brake wheel 14a against the frictional surface 20, thus producing a braking effect, whereby both the shafts 11, 14 are brought to a quick stop.

According to the present invention, in a stopped condition the shaft is always braked. However, in case a manual rotation of the shaft is required, when the cable 26 is pulled to rotate the actuating clutch disk 23, as the fixed clutch disk 24 opposed thereto cannot rotate because of its fixed mounting on the housing 19, there occurs an angular displacement of the relative positions of the recesses 23a, 24a, which creates a force pushing the steel ball 25 out of these recesses, so that the collar 18 as well as the clutch coupling disk 14 move rightwardly in FIG. 3 so as to release the brake and simultaneously release the engagement between the engaging portion 13a of the auxiliary clutch coupling disk 13 and the engaging portion 12a of the main clutch coupling disk 12 by shifting the auxiliary clutch coupling disk secured to the notched step portion of the collar 18 by the movement of the collar 18. Thus the braking force acting on the shaft is removed, and in a case such as where the shutter is wound around a drum mounted on the driven shaft, the shutter may descend due to its own weight because the drum is no longer restrained.

FIGS. 7 to 10 show the detailed structure of the switching device for a manual operation, in which the reference 30 indicates a butt contactor fixedly secured to the machine frame, and the reference 31 indicates a brake control rod for a shutter winding apparatus, which rod is secured to said actuating clutch disk 23 by a screw and arranged in such manner that when it is swung from the position as shown in FIGS. 7 and 8 to the other position as shown in FIG. 9, the brake is released and the shutter may descend automatically. The reference 32 designates a substantially rectangular shaped rotor loosely fitted on the rod 31 so as to rotate freely. On the end surface of its annular portion 32a and projecting outwardly along the rod 31 are provided four inclined sections 33 having stopper steps 33a, and also on the opposed surface of an annular portion 34a projecting inwardly along the rod 31 from an actuator loosely fitted on the rod 31 in a rotatable and slidable manner are provided four inclined sections 35 which engage with said inclined sections 33 in a slidable manner, and between adjacent inclined sections 35 are provided steps 35a to engage with said steps 33a. From this actuator 34 projects a mounting piece 36, to which one end of the cable 26 is connected in such manner that when the cable is drawn the rotor 34 can be turned. The reference 37 indicates a stator fixedly secured to the rod 31, along an outer perpihery of which a sector shaped notch 37a extending over a quarter circle is provided, and a projection 38 projecting from an outer end surface of said actuator 34 is located within this notch. Between this stator 37 and the actuator 34 is inserted a spring 39 which encircles the rod 31, whereby when the actuator 34 is turned clockwise in FIGS. 8 and 9, the actuator 34 will always be turned back in a counterclockwise direction due to the energy stored in the spring 39.

In addition, the reference 40 in FIG. 7 designates another stator fixedly secured to the rod 31, which is associated with a spring 41 inserted between it and the rotor 32 so as to hold the rotor 32 at its new angular position by means of its compressive resilient force to prevent random motion of the motor 32. Alternatively, this random motion may be prevented by forming the opposed surfaces of the stator 40 and the rotor 32 just like the opposed surfaces of the latter and the actuator 34.

Thus, in case that it is desired to cause the shutter to quickly descend by itself, when the actuator 34 is turned by pulling on the cable 26 connected to its mounting piece 36, the actuator 34 rotates a quarter turn from the position where the projection 38 abuts against one end of the notch 37a of the stator 37 to the position where the projection 38 abuts against the other end of the notch 37a, whereupon the actuator 34 rotates the rotor 32 by a quarter turn by forcing the step 33a of the inclined section 33 on the rotor 32 with the step 35a on the inclined section 35 on actuator 34, and thereafter the actuator 34 is restored to its initial position due to the energy stored in the spring 39. At this time, the inclined section 35 slides over the inclined section 33 and comes to rest at another position where its step 35a engages with the next succeeding step 33a, thus holding the rotor 32 at the position to which the rotor 32 has been turned by a quarter turn in the described manner. Since the rotor 32 has a substantially rectangular shape, if one of the longer sides is then opposed to and abuts against the butt contractor 30, as seen in FIG. 8, and due to the reaction of this motion the rotor 32 swings together with the rod 31 in a clockwise direction in FIG. 7, resulting in the rotation of the actuating clutch disk 23, which releases the brake of the winding machines to cause the shutter to descend by itself in the above-described manner. In the case where further braking is desired, the actuator 34 is turned again by a quarter turn. Then a shorter side of the rotor 32 is opposed to the butt contactor 3, as shown in FIG. 9, the rod 31 is moved in a clockwise direction, and consequently the rod 31 is restored to its initial position to again actuate the brake, to charge an energizing device (not shown) such as a spring tensioned between the rod 31 and the machine frame.

According to the present invention, as described in the above, on the opposed surfaces of a clutch coupling disk slidably mounted on a driving shaft and another clutch coupling disk slidably mounted on a driven shaft arranged coaxially with said driving shaft, there are respectively provided a number of slots having a semi-circular cross-section or semi-spherical recesses which correspond to each other and form pairs and within each of the pairs of slots or recesses is accommodated a spherical body having a slightly smaller diameter than that of the pairs one for each, and also a cone brake is formed between an inner wall of a housing and an outer periphery of the clutch coupling disk on the driven shaft in such manner that driving control may be freely achieved in response solely to torque control without requiring relative movement of the both shafts, whereby the rotating shaft may be quickly stopped by the brake by means of a simple mechanism so that the moving parts of the machine associated with the apparatus of the invention can be stopped at a predetermined position. Furthermore, this apparatus may be easily switched to a manual operation by pulling a cable fixedly secured to an actuating clutch disk for releasing the brake which is loosely fitted to the driving shaft so as to oppose to a fixed clutch disk fixedly secured to the housing. Especially according to the present invention, since the clutch coupling disk to be mounted on the driving shaft is divided into main and auxiliary disks, the auxiliary clutch coupling disk which is merely loosely fitted on the driving shaft and which is quite independent of the motion of the driving shaft, being slidably mounted on the driving shaft so as to engage with or disengage from the cooperating main clutch coupling disk, and in the case of manual operation the engagement between the both clutch coupling disks is broken, the rotational motion of the driven shaft is not affected at all by the rotor of the prime motor, and consequently the starting of the operation is well performed and the descending motion of the shutter is achieved quickly where the shutter descends by its own weight. Thus the present invention is quite effective in an emergency case.

While the present invention has been described in the above with reference to its illustrated embodiments, of course it should not be limited only to such embodiments, but many changes and modifications in design could be made within the scope of and without exceeding the spirit of the invention.

What is claimed is:

1. A shutter opening and closing mechanism comprising a prime motor for opening and closing a shutter and having a driving shaft, a main clutch coupling disc having an engaging part on its coupling end surface slidably mounted on said driving shaft, an auxiliary clutch coupling disk having an engaging part engageable with and disengageable from the engaging part of said main clutch coupling disk loosely fitted on said driving shaft, a driven shaft arranged coaxially with said driving shaft and adapted to be coupled to a shutter, a further clutch coupling disk slidably mounted on said driven shaft, the respective opposed surfaces of this coupling disk and said auxiliary clutch coupling disk having a plurality of slots therein having a shape for receiving a ball and being arranged in a plurality of pairs, a spherical body having a slightly smaller diameter than that of the pair of slots positioned in each pair of opposed slots, a casing, a cone brake between said further clutch coupling disk and the inner wall of said casing, and resilient means urging said further clutch coupling disk toward said auxiliary clutch coupling disk, whereby driving control can be freely achieved in response solely to torque control without requiring relative movement between the driving and driven shafts; and an actuating clutch disk for releasing said brake coupled to said brake and loosely fitted on the driving shaft, a cable coupled to said actuating clutch disk, a fixed clutch disk, fixedly secured, to the casing and loosely fitted around the driving shaft and opposed to said actuating clutch disk, whereby upon pulling said cable, the brake can be manually released and also the engagement between said main and auxiliary clutch coupling disk can be simultaneously released.

2. A mechanism as claimed in claim 1 in which the coupling of said cable to said actuating clutch disk comprises a brake control rod fixedly secured to said actuating clutch disk and extending substantially radially of said actuating clutch disk, a butt contactor fixedly secured to the mechanism, a substantially rectangular shaped rotor loosely mounted on said brake control rod and which abuts against said butt contactor, an actuator coupled to said rotor for rotating said rotor, a stator fixedly secured to said rod, and an energizing means coupled between said stator and said actuator for restoring said actuator from its rotated position to its initial position, a projection extending from the outer end surface of said actuator, said stator having a sector shaped notch therein in which said projection is positioned so that the both side edges of said notch serve as stoppers for said projection, inclined engaging parts on the opposed surfaces of said actuator and the rotor having an inclination in the peripherical direction and having stopper steps between adjacent inclined parts extending radially of the actuator and rotor, the angular dimension of one such inclined part being equal to the angular dimension of said sector shaped notch so that the rotor can be caused to follow the rotation of said actuator to abut against or to be separated from said butt contactor, and said rod can be subjected to a swinging motion and said rotor can be locked at a new angular position.

References Cited by the Examiner

UNITED STATES PATENTS

| 554,131 | 2/96 | Maris | 192—15 |
| 1,634,861 | 7/27 | Weymann | 192—8 |
| 3,068,975 | 12/62 | Thever | 192—8 |
| 3,099,338 | 7/63 | Urguhart | 192—18 X |

FOREIGN PATENTS

| 548,715 | 10/22 | France. |
| 630,232 | 5/36 | Germany. |

DON A. WAITE, *Primary Examiner.*

DAVID J. WILLIAMOWSKY, *Examiner.*